(12) United States Patent
Murthy et al.

(10) Patent No.: US 10,287,195 B2
(45) Date of Patent: May 14, 2019

(54) METHOD AND APPARATUS FOR WATER TREATMENT USING SCREENS

(71) Applicant: D.C. Water & Sewer Authority, Washington, DC (US)

(72) Inventors: Sudhir N. Murthy, Herndon, VA (US); Eugenio Giraldo, Robbinsville, NJ (US); Norman D. Dockett, Silver Spring, MD (US); Haydee De Clippeleir, Hamme (BE); Bernhard Wett, Innsbruck (AT); Walter F. Bailey, Jr., Washington, DC (US)

(73) Assignee: District of Columbia Water and Sewer Authority, Washington, DC (US)

( * ) Notice: Subject to any disclaimer, the term of this patent is extended or adjusted under 35 U.S.C. 154(b) by 372 days.

(21) Appl. No.: 14/032,952

(22) Filed: Sep. 20, 2013

(65) Prior Publication Data
US 2014/0083936 A1 Mar. 27, 2014

Related U.S. Application Data

(60) Provisional application No. 61/703,844, filed on Sep. 21, 2012.

(51) Int. Cl.
*C02F 3/00* (2006.01)
*C02F 3/12* (2006.01)
(Continued)

(52) U.S. Cl.
CPC ............... *C02F 3/00* (2013.01); *B01D 36/00* (2013.01); *C02F 3/006* (2013.01); *C02F 3/12* (2013.01);
(Continued)

(58) Field of Classification Search
CPC ...... B01D 29/01; B01D 29/445; B01D 36/00; B01D 36/0006; C02F 2303/24; C02F 1/001; D21D 5/16
(Continued)

(56) References Cited

U.S. PATENT DOCUMENTS 3,467,699 A 9/1969 Bamforth
3,747,771 A 7/1973 Ruthrof
(Continued)

FOREIGN PATENT DOCUMENTS

CN 2166870 Y 6/1994
CN 101300196 11/2008
(Continued)

OTHER PUBLICATIONS

Chinese Office action dated Feb. 26, 2016, issued in connection with corresponding Chinese Application 201380049244.2.
(Continued)

*Primary Examiner* — Claire A Norris
(74) *Attorney, Agent, or Firm* — Blank Rome LLP

(57) ABSTRACT

An apparatus and method for selecting, retaining or bioaugmenting solids in an activated sludge process for improving wastewater treatment using screens. The screens can be used to separate and retain solids based on size, compressibility or shear resistance. The screens are used to separate and select slow growing organisms, faster settling organisms, or materials added to absorb, treat or remove constituents in the activated sludge process. A swapping screen arrangement provides another means of selecting various particles. The exposed shear rate or time, particle compression, or SRTs can be adjusted manually and/or automatically in response to detected readings from an instrument such as a spectrophotometer or other optical approaches to optimize selection of organisms. The present disclosure may be configured as
(Continued)

an activated sludge system operated at different solids residence times (SRT) for different solids fractions allowing slow growing organisms to get established in competition with faster growing organisms or aggregates thereof.

14 Claims, 13 Drawing Sheets

(51) Int. Cl.
*C02F 3/28* (2006.01)
*B01D 36/00* (2006.01)
*C02F 3/30* (2006.01)

(52) U.S. Cl.
CPC .......... *C02F 3/1205* (2013.01); *C02F 3/1236* (2013.01); *C02F 3/2866* (2013.01); *C02F 3/1221* (2013.01); *C02F 3/1226* (2013.01); *C02F 3/307* (2013.01); *C02F 2209/005* (2013.01); *C02F 2209/10* (2013.01); *C02F 2209/105* (2013.01); *C02F 2303/24* (2013.01); *Y02E 50/343* (2013.01); *Y02W 10/15* (2015.05)

(58) Field of Classification Search
USPC ............ 210/174, 195.3, 297, 307, 413, 499; 209/73
See application file for complete search history.

(56) References Cited

U.S. PATENT DOCUMENTS

| | | | |
|---|---|---|---|
| 3,959,124 A | 5/1976 | Tchobanoglous | |
| 4,014,747 A | 3/1977 | Kenyon | |
| 4,236,999 A | 12/1980 | Burgess | |
| 4,725,364 A | 2/1988 | Hurley | |
| 5,361,909 A | 11/1994 | Gemmer | |
| 5,397,755 A | 3/1995 | Parker et al. | |
| 5,824,222 A | 10/1998 | Keyser et al. | |
| 5,910,245 A | 6/1999 | Bernhardt et al. | |
| 6,569,335 B1 | 5/2003 | Johnson | |
| 6,814,868 B2 | 11/2004 | Phagoo et al. | |
| 7,070,693 B2 | 7/2006 | Kelly | |
| 7,569,147 B2 * | 8/2009 | Curtis | C02F 3/12 210/607 |
| 7,611,632 B1 | 11/2009 | Wang | |
| 2003/0006200 A1 | 1/2003 | Phagoo et al. | |
| 2007/0085998 A1 | 4/2007 | Brestel | |
| 2008/0314828 A1 | 12/2008 | Campbell | |
| 2010/0006501 A1 | 1/2010 | Laurell | |
| 2010/0264082 A1 | 10/2010 | Conner | |
| 2011/0017664 A1* | 1/2011 | Conner | B01F 3/04517 210/631 |
| 2011/0036771 A1 | 2/2011 | Woodard | |
| 2011/0186513 A1 | 8/2011 | Vuong | |
| 2013/0069759 A1 | 3/2013 | Padgett | |
| 2013/0277302 A1 | 10/2013 | Doelle et al. | |
| 2014/0224730 A1 | 8/2014 | Conner et al. | |
| 2014/0309607 A1 | 10/2014 | Richlen | |

FOREIGN PATENT DOCUMENTS

| | | |
|---|---|---|
| CN | 101479200 | 7/2009 |
| CN | 102066269 | 5/2011 |
| CN | 102548911 | 7/2012 |
| EP | 1 595 851 A1 | 11/2005 |
| JP | 2000343098 A | 12/2000 |
| JP | 2003093908 A | 4/2003 |
| JP | 2005349304 A | 12/2005 |
| JP | 2006035069 A | 2/2006 |
| JP | 2012106176 A | 6/2012 |
| KR | 2007076919 A | 7/2007 |
| WO | WO 94/24056 | 10/1994 |
| WO | WO 2013/039582 A1 | 3/2013 |

OTHER PUBLICATIONS

Curvers, "Compressibility of biotic sludges—an osmotic approach," *Chem. Eng. J.*, 166 (2011) p. 678-686.
English language translation of Chinese Office action dated Feb. 26, 2016 issued in connection with corresponding Chinese Application 201380049244.2.
Singapore Written Opinion, dated Mar. 24, 2016, pp. 1-5, issued in connection with corresponding Singapore Application 11201502140T.
Singapore Written Opinion, dated Nov. 15, 2016, pp. 1-4, issued in connection with corresponding Singapore Application 11201502140T.
Japanese Office Action and its English-language translation dated May 9, 2017, issued in connection with corresponding Japanese Application 2015-533255.
H. De Clippeleir et al., "Screens as a Method for Selective Anammox Retention in Single Stage Deammonification Processes". Fiscal Year 2013—Studies, research papers, and analyses.
M. Joyce et al., "Replacement of Activated Sludge Secondary Clarifiers by Dynamic Straining", May 1975.
D. Sen et al., "Performance of Fixed Film Media Integrated in Activated Sludge Reactors to Enhance Nitrogen Removal", 1995.
Communication Pursuant to Article 94(3) EPC, Application No. 13 839 299.8, Aug. 6, 2018.
Communication Pursuant to Rule 114(2) EPC, Application No. 13 839 299.8, Jul. 20, 2018.

* cited by examiner

METHOD AND APPARATUS FOR WATER TREATMENT USING SCREENS

This application claims the benefit of U.S. Provisional Patent Application No. 61/703,844, filed Sep. 21, 2012. The entire disclosure of U.S. Provisional Patent Application No. 61/703,844 is incorporated herein by reference.

Screening of wastewater is a common method of treatment at wastewater treatment plants. Wastewater screens have been used to remove large or inert solids for collection and disposal for over a century. Wastewater screening to remove such debris typically occurs in an upstream process to protect downstream processes from such materials. More recently, screens have been used within the activated sludge process itself to select and remove inert material.

U.S. Pat. Nos. 4,541,933, 5,824,222, 6,814,868 and 7,569,147 discuss variations of this concept for the removal of inert materials from activated sludge and membrane bioreactors, i.e. a selection for undesired solids was applied. A second use of screens in the activated sludge processes is to substitute the final clarification process with a screen to retain and return the active flocs to the aeration basin by substituting the clarifier with a membrane or a screen. Applications of these are found as filter screen and membranes for solid liquid separation. An example of the latter application is U.S. Pat. No. 6,821,425 and the processes described in the scientific literature by Kiso et al. 2005, Tewari et al. 2010, Ren et al. 2010. Another use of screens is described in U.S. Pat. No. 3,959,124 and Hernandez et al. 2002, in which a screen is located between the aeration tank and the solid liquid separation device in an activated sludge process in order to reduce the solids loading to the solid-liquid separation device. The solid-liquid separation device could be a clarifier, or a filter membrane.

In summary, screens have been used in the activated sludge process to discard trash, substitute clarifiers, or reduce loadings to solid-liquid separation device. None of these previously disclosed processes uses screens for both 'selection' and 'retention' of solids, or to physically synthesize biological solids of appropriate structures to enhance activated sludge performance associated with controlling reactions for removal of constituents.

A current operational drawback of an activated sludge process is that the solids residence time is the same for all of the fractions in the activated sludge. This drawback has been overcome, for example, by using plastic media to retain organisms on biofilms for longer solids residence times. See, e.g., U.S. Pat. Nos. 5,458,779 and 7,854,843. Other options include the use of cyclones that can differentiate solids based on specific gravity (US 2011/0198284 A1). None of these processes selects for an increase in residence time of solids based on size, compressibility or shear characteristics associated with screening.

SUMMARY

The disclosed embodiments include a selection process using screens for retaining particulate constituents based on size and compressibility thereof. In particular, screens are used in the activated sludge process to 'mine' and 'retain' specific types of solids, and these retained solids improve process performance. This ability to mine activated sludge solids of a specific range of size, compressibility and shear resistance through selection and retention of material is a key feature of the embodiments of the present disclosure. The present disclosure leads to an activated sludge system operated at different solids residence times (SRT) for different solids fractions allowing slow-growing organisms to get established in competition with faster-growing organisms or aggregates thereof. Physical forces (shear/tangential stress and/or normal stress) are augmented to maintain the different solids residence times in the long term by achieving more distinct particle separation, e.g. by shearing off fast growing or superficial biomass from the surface of slowly growing aggregates or by using pressures to extract and retain less compressible materials from a more compressible biomass.

The present disclosure is not necessarily limited for use in connection with wastewater. The apparatuses and methods described herein may be used in connection with treatment of water other than wastewater. For example, the present apparatuses and methods may be used to remove nutrients from agricultural runoff, and/or to treat leachate from a solid waste operation, animal manure, water from an aquaculture system, and digestate or sludge from an anaerobic digestion process, and address groundwater pollution, treat drinking water and treat hazardous wastes.

DETAILED DESCRIPTION

Description of Screening Apparatus: The disclosed embodiments provide a screen to select and retain particles in a wastewater treatment process such as an activated sludge system based on particle size, compressibility and/or shear. The size of the particles retained depends on the size of the screen mesh, in the 10-10,000 micron size range (more preferably in the range of from 10 to 2,000 microns, and even more preferably in the range of from 100 to 2,000 microns). Larger sized granules can be retained along with smaller sized flocs or granules based on mesh size. In addition to size retention, the ability to selectively retain compressible or non-compressible material depends on the washing volume or velocity, vacuum applied or the force applied perpendicularly. The shearing of the material depends on the amount of tangential stress applied. The more compressible material tends to pass through the screen as it is washed, and the screen will abrade the particles when shear forces are applied. Depending on the applied shear intensity and duration or frequency the surface of aggregates gets shaved off, the overall particle size gets reduced and particles of low shear resistance tend to get broken apart and washed out. Therefore shear forces (typically tangential) and compression forces (typically perpendicular) or a combination of these forces, as shown in FIG. 1a, FIG. 1b, FIG. 1c and FIG. 1d, in connection with screen-application selects for aggregate sizes of an appropriate size with more dense or solid structure (e.g. granules of slow growing biomass usually are more shear resistant and less compressible compared to the fast growing flocculant type of biomass). Additionally application of shear reduces the diffusion resistance of these denser aggregates and leads to smaller particles with larger active surfaces. This can be accomplished additionally using a device which compresses particles during screening by applying pressure such as a positive pressure in screen-flow direction such as a pressure head from a spray bar or of a negative pressure such as suction head produced by a vacuum pump. In other variations the exposed shear rate or time, particle compression, or SRTs can be adjusted manually and/or automatically in response to detected readings from an analytical instrument such as a spectrophotometer or other optical approaches to optimize selection of organisms.

Figure 1A:
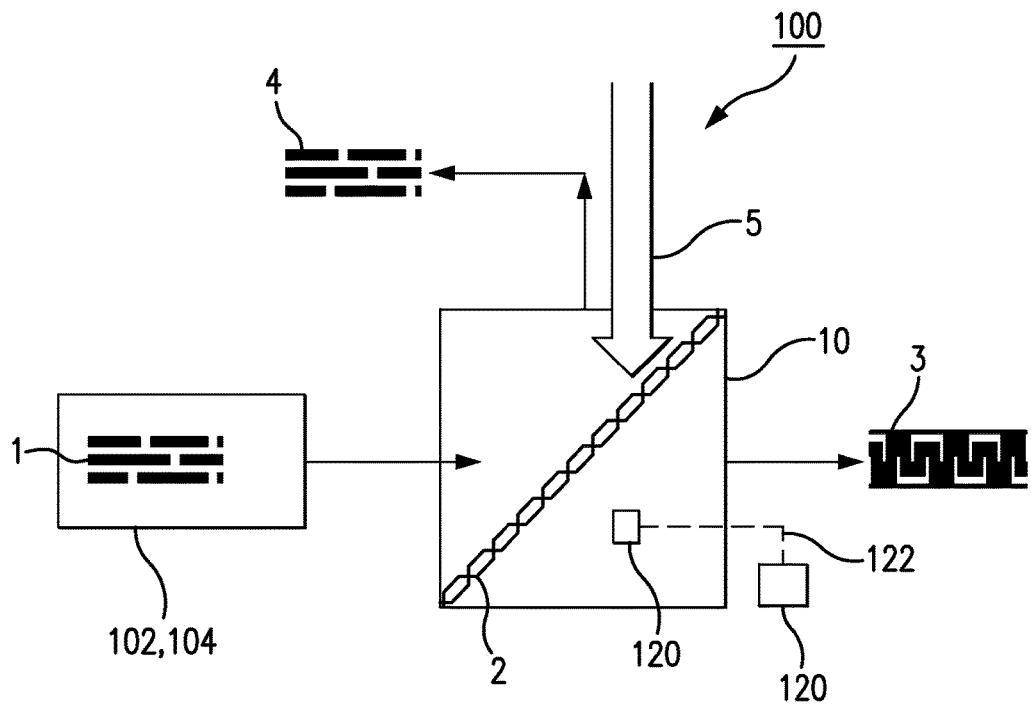
FIGS. 1a-1g show a screening apparatus according to an example embodiment, including a screen wash applying stress on particles at four different angles.
Figure 1B:
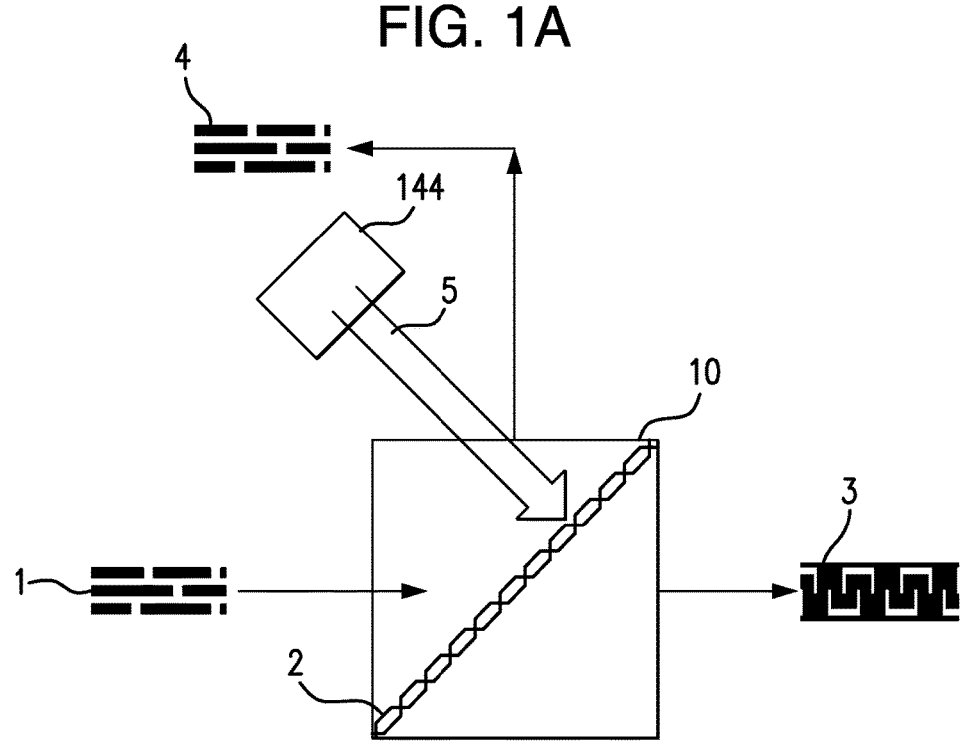
Figure 1C:
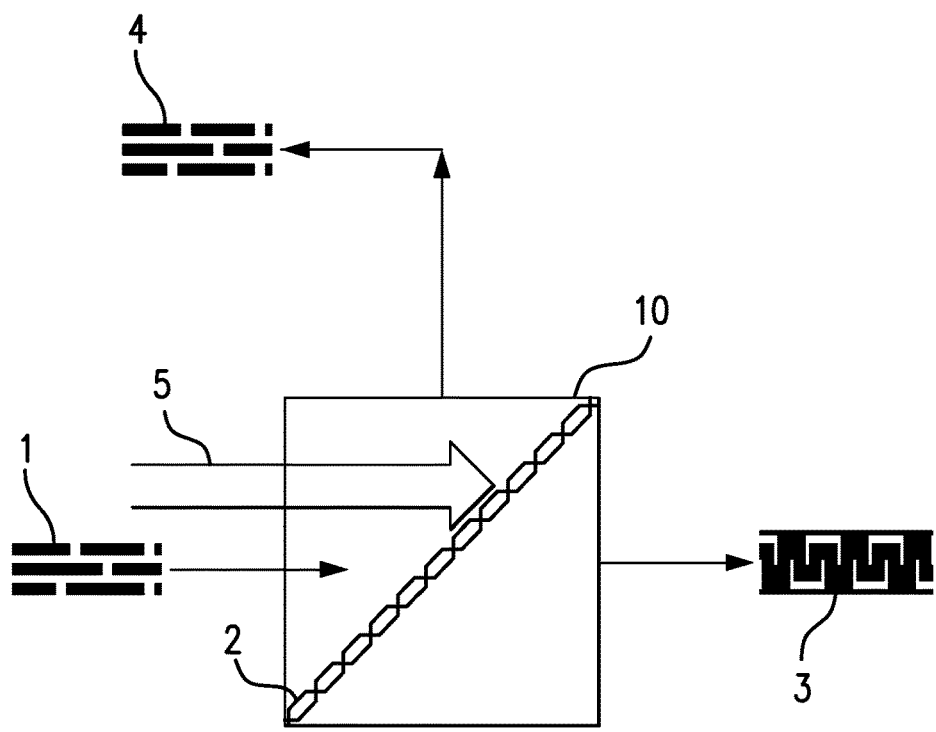
Figure 1D:
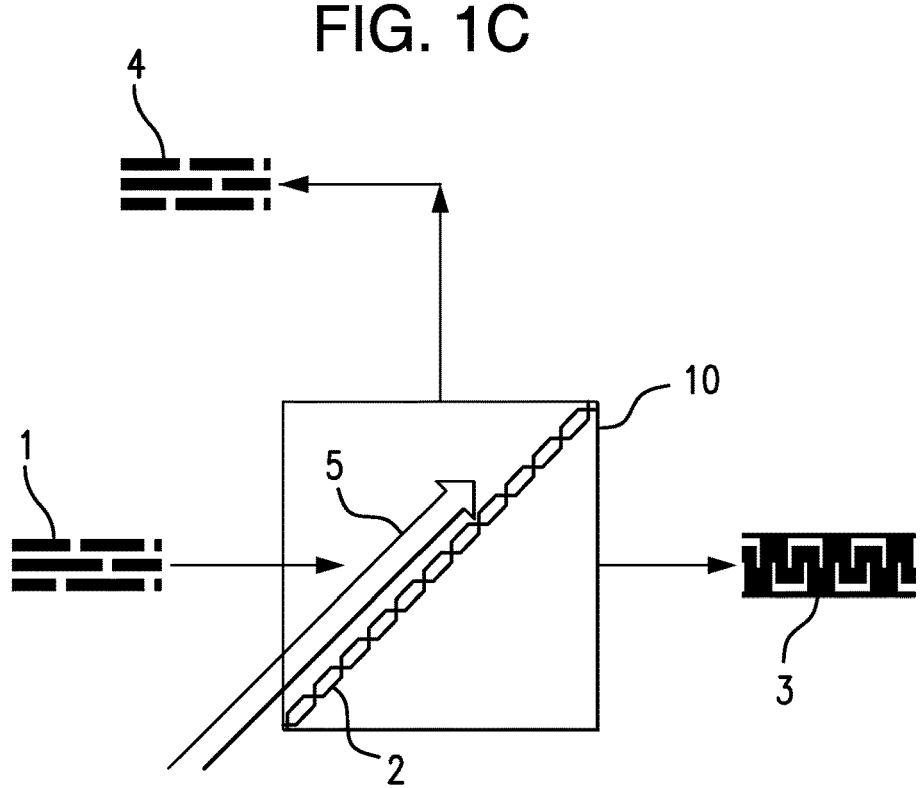

FIGS. 1a-1d show four perspective views of one example embodiment of the screening apparatus 10. As shown in these figures, the screening apparatus 10 processes an entering wastewater stream 1 via an internal particle/solids separator 2 which screens waste constituents out to a waste stream 3 while separating the waste constituents from those constituents of the wastewater stream 1 that are to be retained 4. Wastewater 1 can be pre-screened prior to entering screening apparatus 10 in order to remove larger trash or granules that need to be excluded from the process. The use of the screen 2 increases the solids residence time of the screened constituents 4 and provides a selection pressure for larger biological particles, thus uncoupling the solids residence time of the screened constituents 4 from the solids residence time of the unscreened (pass through) constituents (waste stream 3). This uncoupling of solids residence time allows for additional reaction time for the screened constituents 4. The screening efficiency can be calibrated to increase or decrease the solids residence time of the screened constituents 4. An optional screen wash 5 using gas, liquid, vacuum, or some combination of matter can be added to further assist in the screening process. The screen wash 5 can be directed toward the screen 2 in a variety of different ways, which differently affect the solids residence time, including but not limited to, along the vertical axis (FIG. 1a), an angle directly perpendicular to the screen (FIG. 1b), or along the horizontal axis (FIG. 1c) or even tangential to the screen (FIG. 1d).

Figure 2:
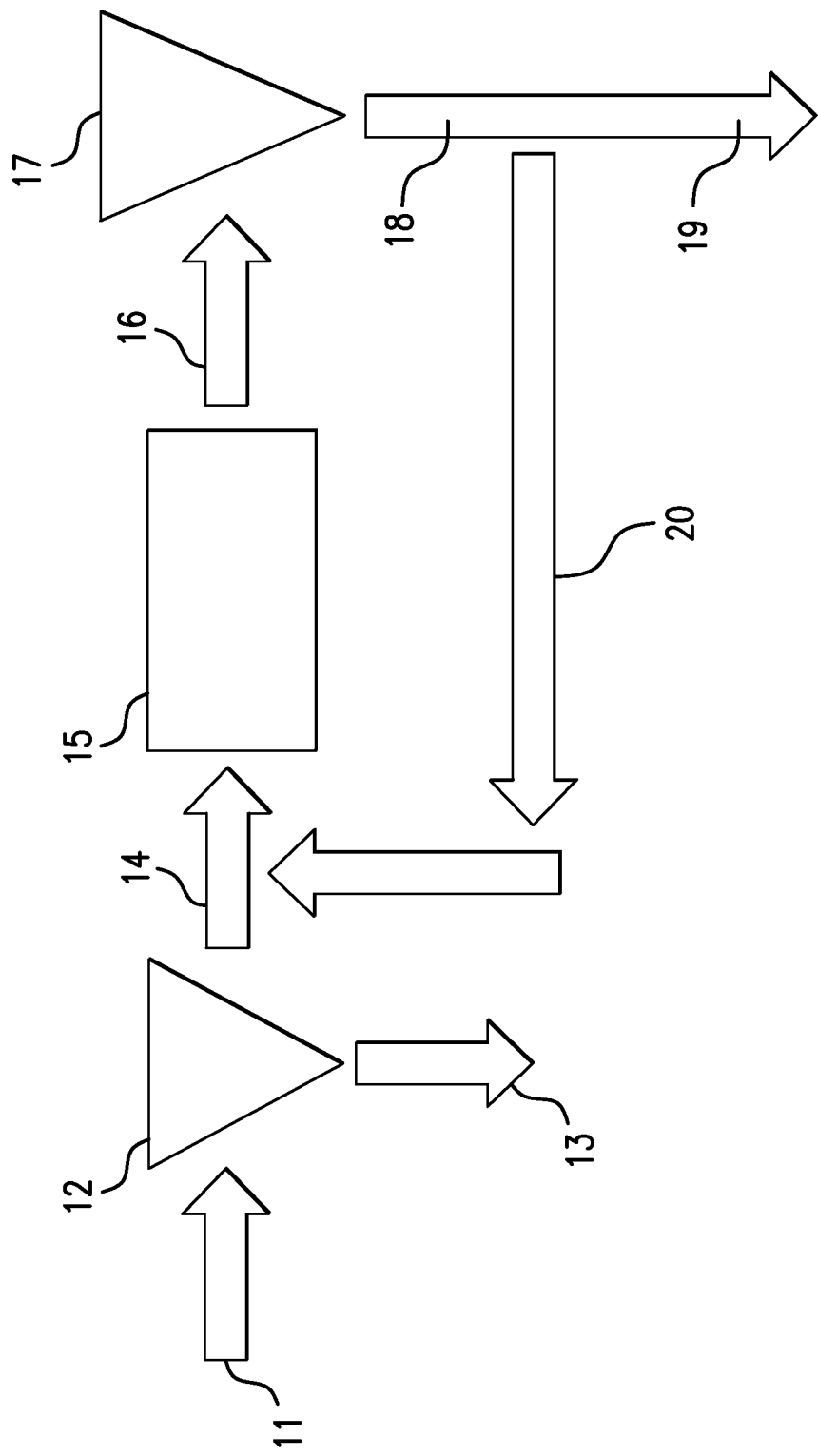
FIG. 2 is a flowchart showing a method for an activated sludge process in accordance with an example embodiment.

Screen Apparatus in Activated Sludge Process: The screen of the disclosed embodiments can be used in an activated sludge system consisting of a bioreactor that is used for the treatment of wastewater, or other liquor such as from internal sidestreams. The bioreactor is connected to a separation device, which may include a clarifier, an upflow granular reactor, a membrane, a filter, a dissolved air floatation device, or any other separation device, for the recycling or removal of biomass. FIG. 2 is a flowchart showing a method for a typical activated sludge process in accordance with an example embodiment. Wastewater stream 11 enters into an optional primary separator 12. Excess wastewater 13 exits the process and the wastewater stream 14 enters a bioreactor 15. After exiting the bioreactor 15, the wastewater stream 16 enters into another separator 17. The separator 17 can be, for example, a clarifier, an upflow granular reactor, a membrane, a filter or a dissolved air floatation device. The remaining wastewater 18 is thus separated from activated sludge 19, some of which is recycled 20 to bioreactor 15 in order to efficiently process more out of the system as the remaining excess sludge exits the system.

Figure 3:
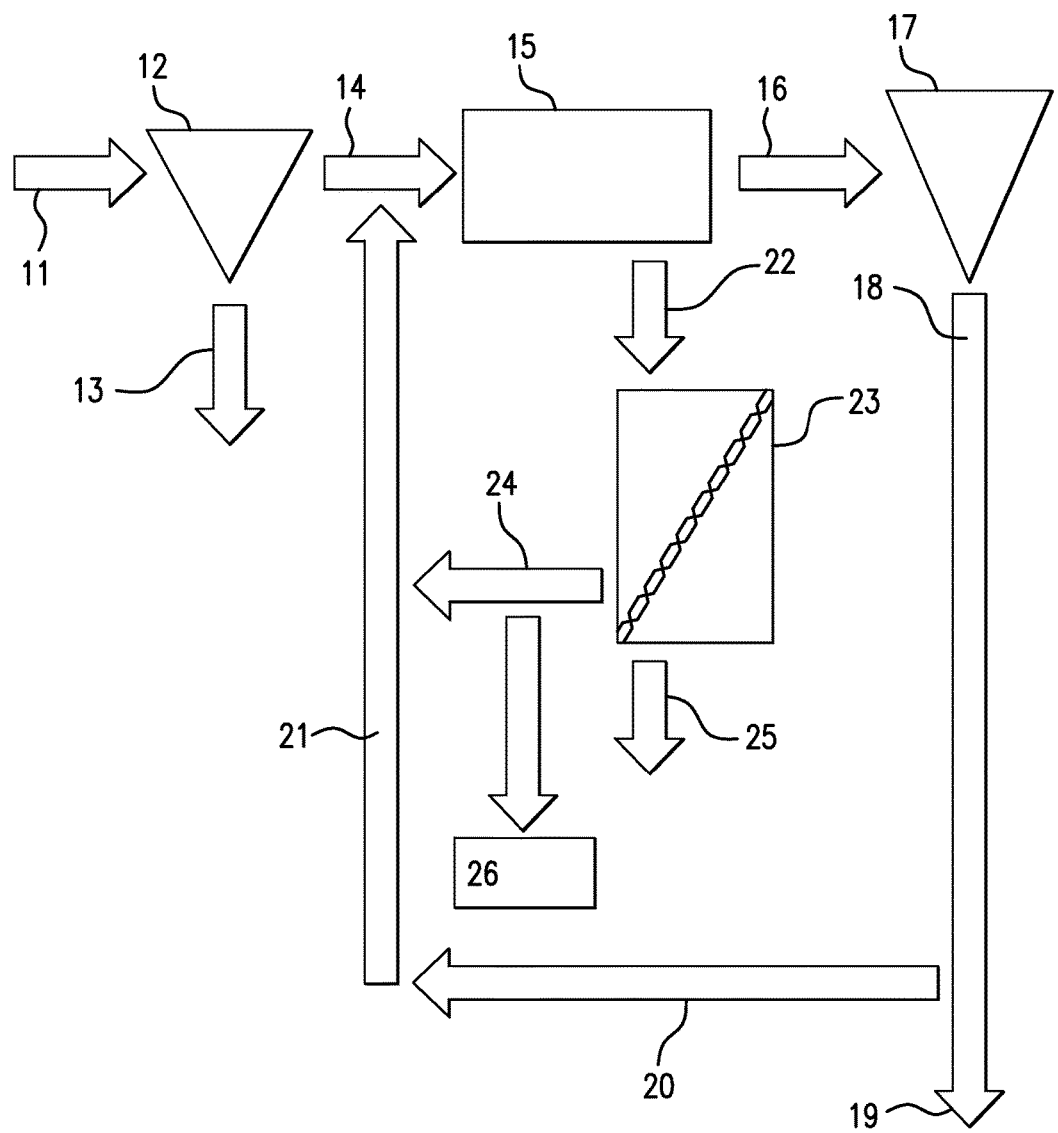
FIG. 3 is a flowchart showing another method for an activated sludge process in accordance with an example embodiment.

FIG. 3 is a flowchart showing another method for an activated sludge process in accordance with an example embodiment. The embodiment of FIG. 3 is similar to that of FIG. 2 (like elements are labeled the same and not described again) but includes an additional path 22 from the bioreactor 15 for mixed liquor which is processed by a screening apparatus 23 before being separated into a clear effluent stream 24 to be recycled into the system and an excess stream 25 to exit the system. Some of the effluent stream 24 may be wasted (26). The amount of the effluent stream 24 that is wasted (26) may be adjustably controlled to control the solids residence time of the material that is retained by the screening apparatus 23. The screen 23 can be integrated into the bioreactor 15 in a sequencing batch arrangement or can be separate from bioreactor 15 as shown in FIG. 3. The separation could occur through gravity or flotation. The solids residence time for the system depends on the amount of excess sludge that is removed continuously or periodically from the separation device, which may be similar to that shown in FIGS. 1a-1d. An increase in excess sludge removal decreases the solids residence time and vice-versa.

Figure 4:
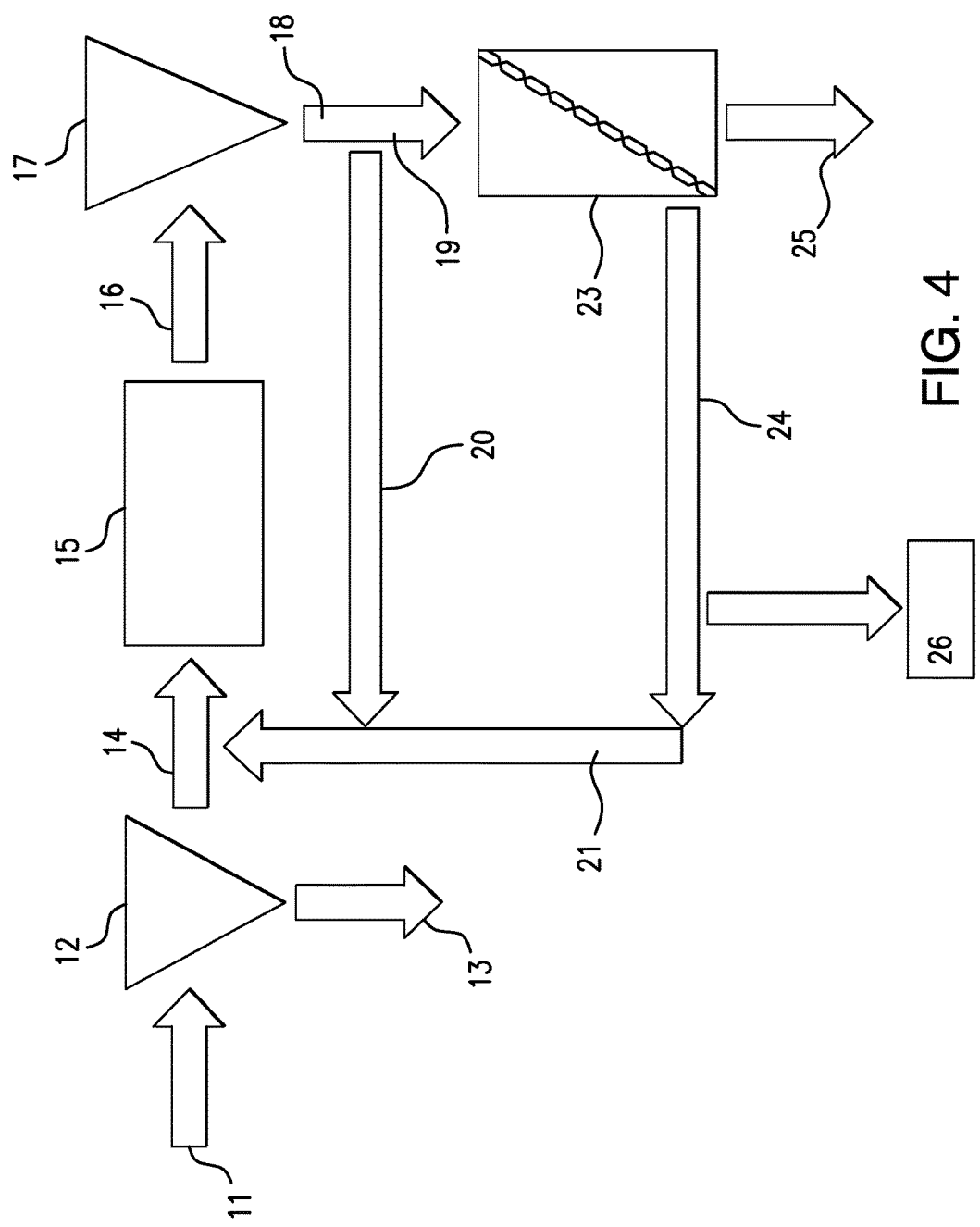
FIG. 4 is a flowchart showing another method for an activated sludge process in accordance with an example embodiment.

FIG. 4 is a flowchart showing another method for an activated sludge process in accordance with an example embodiment. As seen in FIG. 4, screen device 23 can be provided (either in parallel or in series with the biomass settlement/floatation device) in line with the excess sludge 19 withdrawal system, instead of as an additional path from the bioreactor 15 (as shown in FIG. 3). The excess sludge removal can occur directly from a separator 17 following the bioreactor 15. In this case the screen can be located at this alternate excess sludge withdrawal system from the bioreactor 19. As with the apparatus illustrated in FIG. 3, some of the effluent stream 24 from the screening apparatus 23 may be wasted (26). The amount of the effluent stream 24 that is wasted (26) in the FIG. 4 apparatus may be adjustably controlled to control the solids residence time of the material that is retained by the screening apparatus 23.

Figure 5:
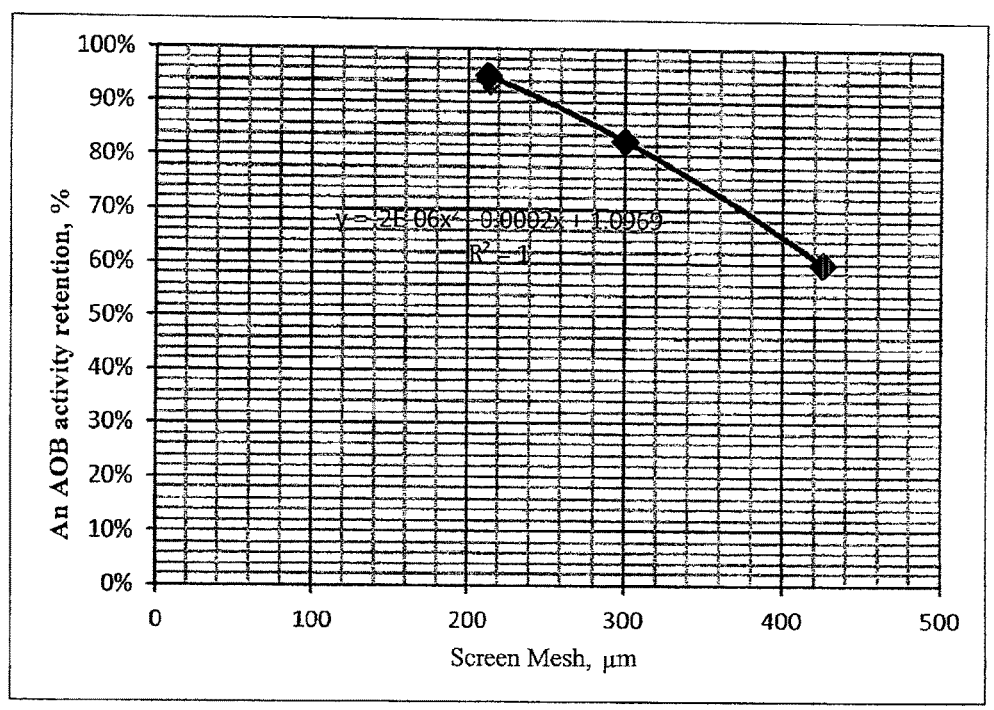
FIG. 5 is a graph showing data that describes the efficiency of a screen that retains granules based on size, according to an example embodiment.

Method to select for granules: An additional feature disclosed herein will retain flocs or granules based on an upper and lower bound screen mesh size. A specific granule/particle size range may be retained by discarding very large granules or trash in a larger mesh size screen following which, very small granules are allowed to pass through in a smaller mesh screen. Thus, single or multiple screens in series could be used for selective residence and/or pass through of size fractions as desired. Functionally, larger size particles settle faster (based on Stokian settling), allowing for the rapid removal of the material in the separation device. Increased settling rates are beneficial to treatment plants as this increase can improve capacity utilization of the activated sludge process. Screens can also help develop a selection process for the management of reactions in larger granular aggregates versus the more diffusive flocculant fractions present typically in an activated sludge tank. Larger aggregates also enable organizational structures for cohabitation or symbiosis not present in smaller flocs. FIG. 5 shows data describing the efficiency of a screen that retains granules based on size, according to an example embodiment. In this example, a 212 µm screen was used for selection and retention of anaerobic ammonium oxidation (anammox or AnAOB) bacteria granules. The graph in FIG. 5 shows the AnAOB activity retention efficiency of granules greater than 212 µm. Selection can also be based on resistance to shear in addition to particle size. In one embodiment of the disclosed method additional shear-stress is applied either by manipulation of the screen boundaries (e.g. vibrating or rotating drum screen, by applying mechanical forces to the edges of the screen) or by the liquid (e.g. a spray-bar may be located on the front- or back-side of the screen) in order to improve selection efficiency and to reduce diffusion resistance of the more shear resistant solids fraction.

Figure 6:
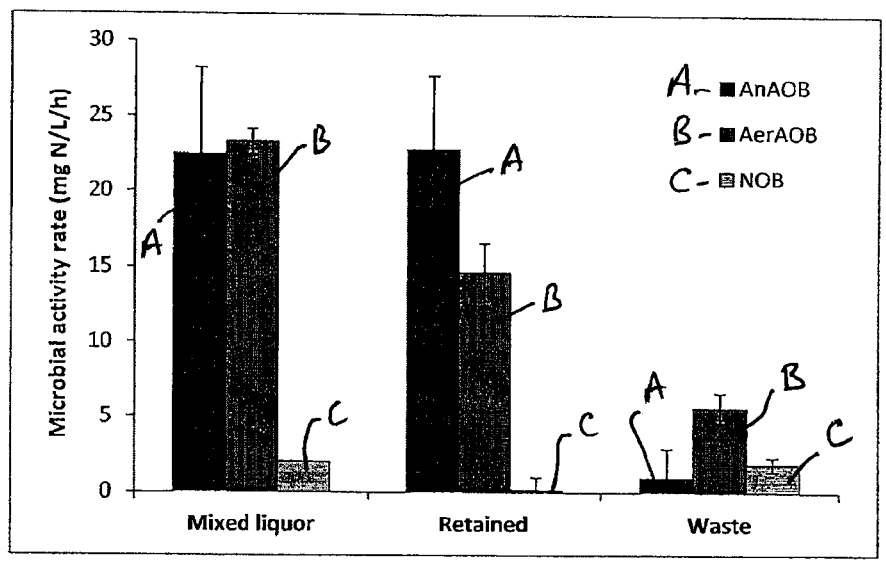
FIG. 6 is a graph showing data that describes effective separation of solids residence times of specific organisms by screen selection based on size, according to an example embodiment.

Method to select, retain or bioaugment biologically active material: Bacteria or other microorganisms can form separate aerobic, anoxic or anaerobic granules or a combination of aerobic, anoxic or anaerobic granules. These granules can be selected and retained within the activated sludge process by screens. For example, as described in FIG. 6, the selection and retention of slow growing AnAOB granules or autotrophic aerobic granules can be accomplished using screens. These enriched and retained organisms or conversely the pass through organisms can also be bioaugmented to other treatment processes as appropriate. FIG. 6 shows data describing effective separation of solids residence times of specific organisms by screen selection based on size. In this example, effective retention of anammox (AnAOB) granules based on size selection with a 212 µm mesh size screen is shown. Moreover, unwanted nitrite oxidizing bacteria (NOB) growing in smaller particles (<212 µm, accounting for 32% of the mixed liquor volatile suspended solids (VSS) fraction) were selectively washed out. Aerobic ammonium oxidizing bacteria (AerAOB) were both found in larger and smaller particle sizes. Therefore, this screen selection allowed for distinct solids residence times (SRT) for different organisms, in this case AnAOB, AerAOB and NOB. In FIG. 6, the microbial activity rate of AnAOB, AerAOB and NOB is represented by columns A, B and C, respectively, for each of the mixed liquor, the retained fraction, and the waste fraction.

Method to select and retain chemically reactive material: Sometimes there is a need to add chemically reactive material to activated sludge. For example, activated carbon, ion exchange resins or metal/non-metal catalysts can be added to sorb, treat, react or mine soluble microconstituents or ions from wastewater or activated sludge. These chemically reactive materials can be added to the activated sludge or other treatment tanks. The subsequent selective retention and or removal of materials such as activated carbon, catalysts and ion exchange resins can be facilitated using screens. For example, pollutants, such as estrogenic compounds or pharmaceuticals could be selectively removed through the retained activated carbon. Alternatively, ion exchange resins could be used to remove ammonium or phosphates ions. Other inert material could be used to improve the physical characteristics of activated sludge (e.g., to improve settleability) and then be selectively retained using screens.

Figure 7:
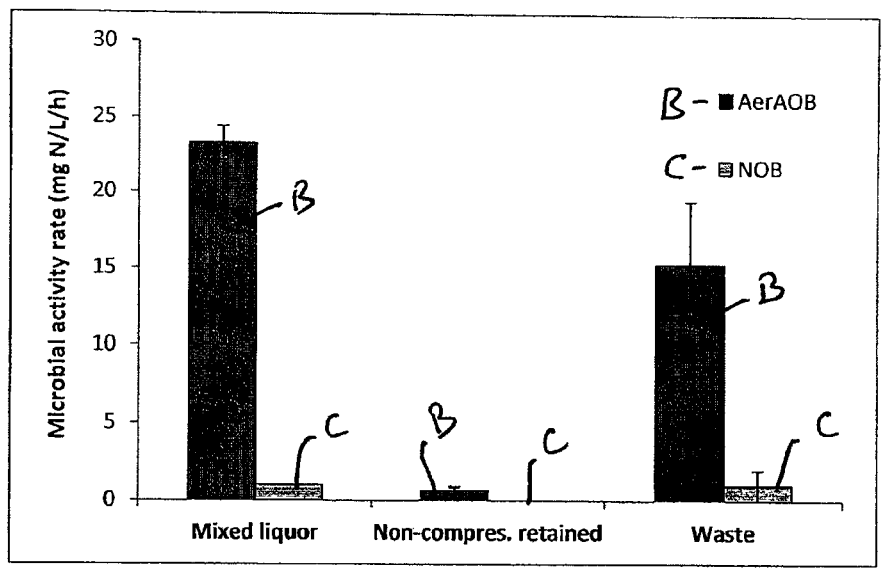
FIG. 7 is a graph showing selective retention of non-compressible material of a certain size by vacuum screening, according to an example embodiment.

Apparatus for SRT selection based on size, compressibility and shear: Several types of screens are available for use in the disclosed embodiments including and not limited to vacuum screens, rotary/drum screens, step screens, vibrating screens or stationary screens. FIG. 7 shows selective retention of non-compressible material of a certain size by vacuum screening. In this example, organisms growing in flocs (compressible material) were more effectively washed out by screen selection based on size and compressibility (62% compared to 32% of mixed liquor VSS), which was done in this case by vacuum screening with a 212 µm screen. FIG. 7 shows the higher washout of AerAOB flocs based on size and compressibility compared to the out-selection only based on size which is shown in FIG. 6. The latter method allows for a more distinct separation between SRT of compressible flocs and non-compressible granules. In FIG. 7, the microbial activity rate of AerAOB and NOB is represented by columns B and C, respectively, for each of the mixed liquor, the non-compressible retained fraction, and the waste fraction.

Figure 8A:
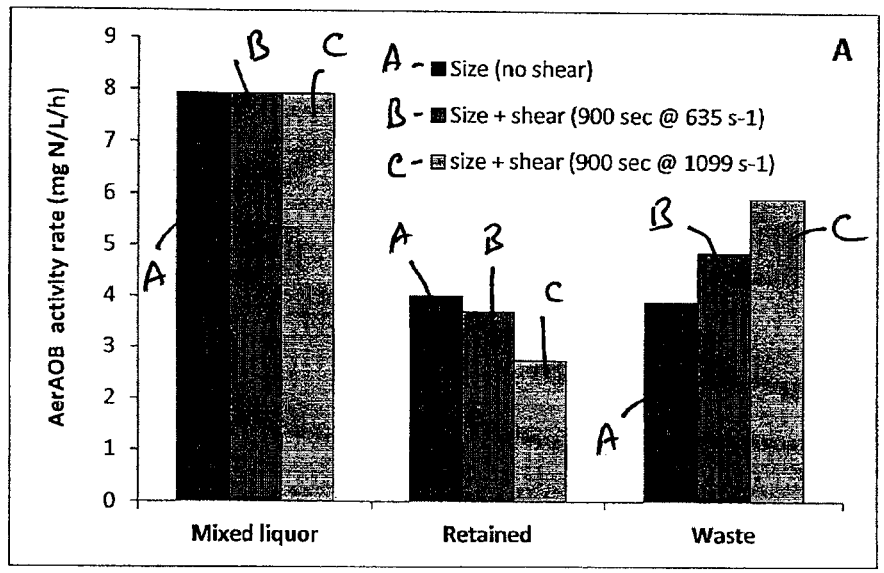
FIGS. 8A and 8B are graphs showing the increased out-selection of specific organisms by applying shear in addition to screen selection based on size, according to an example embodiment.
Figure 8B:
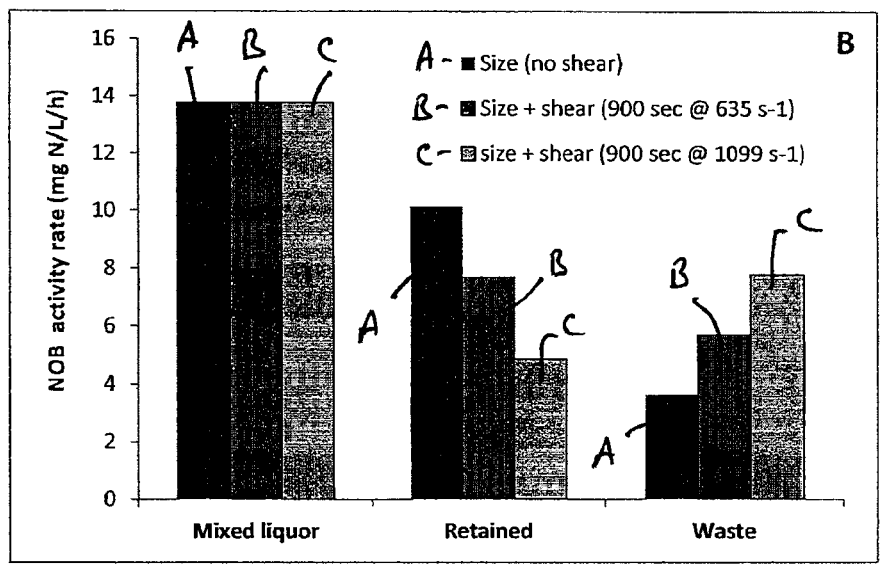

FIGS. 8A and 8B show data of application of shear forces on the surface of granules, physically removing unwanted microbes growing on top of granules. In this example, shear forces were applied on the retained (212 µm) fraction containing anammox granules covered by an AerAOB/NOB layer. By applying shear on the particles retained by the 212 µm screen, the AerAOB and NOB layer could effectively be sheared off. The effect was proportional to the shear force applied. This showed that applying shear in combination with selection based on size and compressibility could allow for both control of the composition of granules and their specific retention. The biomass retained decreased by the application of shear from 74% to 72% and 56% for the scenarios without shear, at 635 s$^{-1}$ and at 1099 s$^{-1}$, respectively. In FIG. 8A, the AerAOB activity rate for screening only based on size, screening with a first shear, and screening with a second shear is represented by columns A, B and C, respectively, for each of the mixed liquor, the retained fraction, and the waste fraction. In FIG. 8B, the NOB activity rate for screening only based on size, screening with a first shear, and screening with a second shear is represented by columns A, B and C, respectively, for each of the mixed liquor, the retained fraction, and the waste fraction.

Figure 9A:
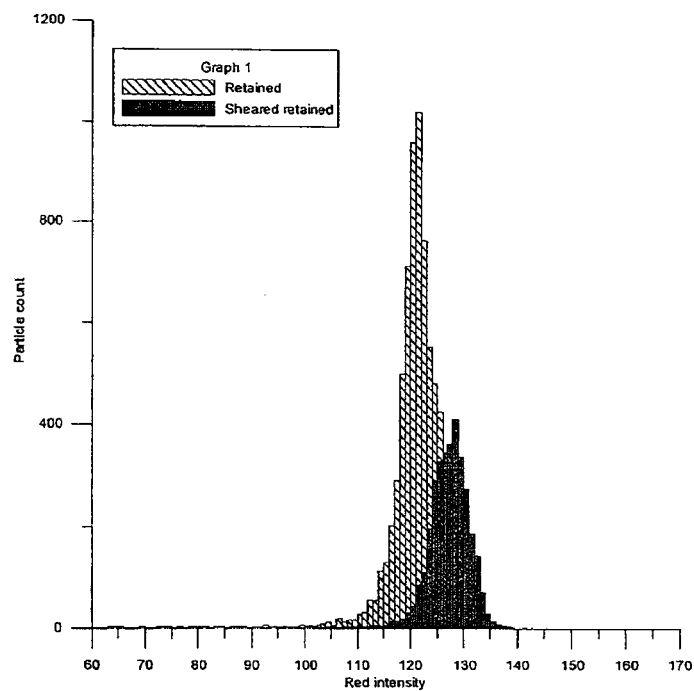
FIGS. 9A to 9C show the use of color intensity to differentiate between particles with different performance, according to an example embodiment.
Figure 9B:
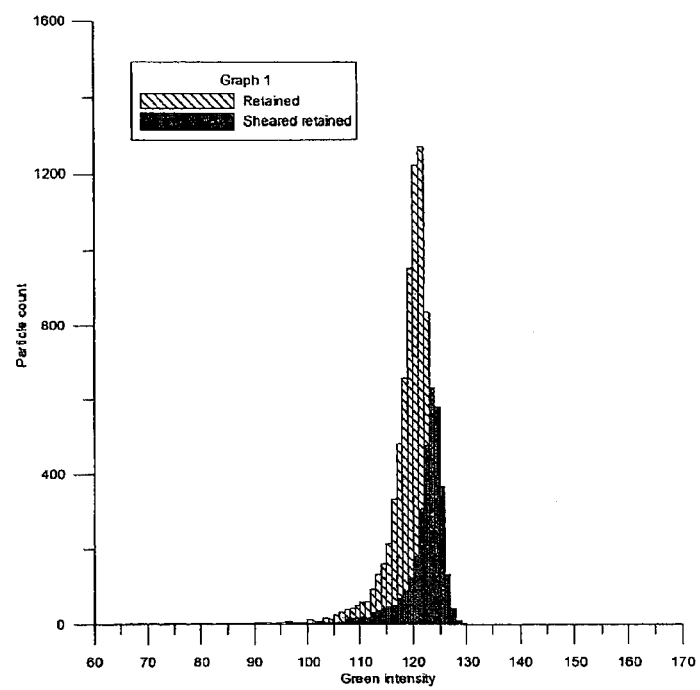
Figure 9C:
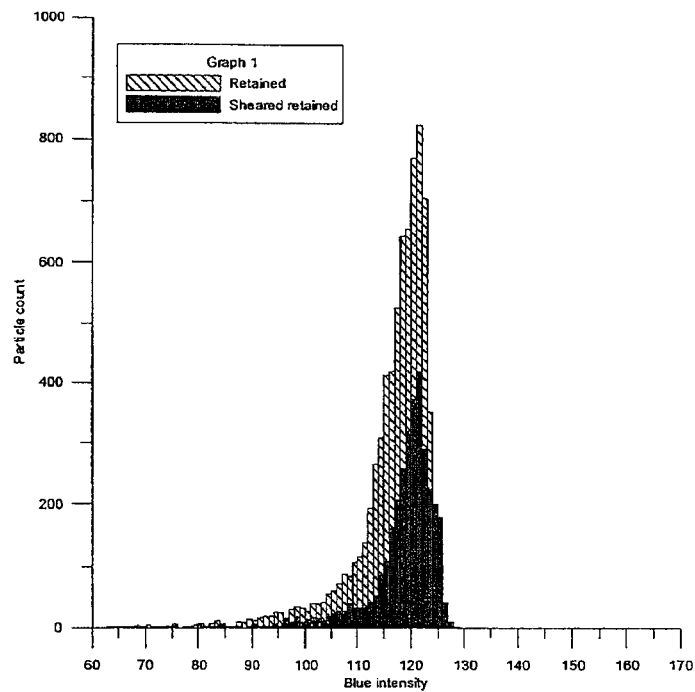

Apparatus to Control and Modulate Size, Shear, Compressibility and SRT: The use of screens in the disclosed embodiments is particularly useful to increase and modulate the solids residence time of the mined material that have been selected expressly for providing additional treatment time. Analytics and controls can be used to modulate the type of screened material. FIG. 9 shows the use of color intensity to differentiate between particles with different performance. In this example, the red (FIG. 9A), green (FIG. 9B) and blue (FIG. 9C) intensity was measured on the retained fraction containing anammox granules (typically bright red in color) covered by an AerAOB/NOB layer (typically brown in color) and on the retained fraction after applying a shear rate of 1099 s$^{-1}$ for 900 sec. The shear forces could increase the red intensity significantly which could be linked to more loss of AerAOB/NOB activity (see FIG. 8). Also in the green and blue intensity curves, a shift in intensity was observed. Thus, a control algorithm can be developed to modulate shear and compressibility applied.

Figure 10:
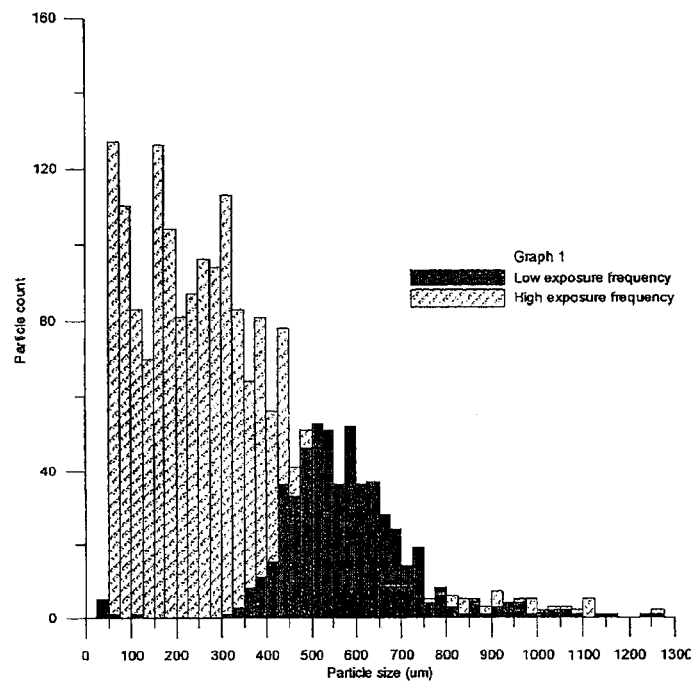
FIG. 10 is a graph showing data that describes selection of particle distributions based on exposure frequency to screens.

FIG. 10 shows that the selection of a certain particle distribution by wasting through a screen is dependant on the frequency of exposure to that screen. In this example, more frequent exposure of the sludge to the 212 µm screen, and thus operation at low SRT (12 days) selected for a particle distribution around the mesh size of the screen. Operation at long SRT (30-69 days) and thus low exposure frequency to the screen allowed for larger size particles while particles smaller than the screen size were more efficiently washed out. Thus, a control algorithm can be developed to modulate screening frequencies or the SRT of the process.

In summary, a screening apparatus for selection, retention, detection and control based on size, shear, compressibility and SRT are described. Methods for selection of granules, organisms of biological origin, and chemically reactive material are considered key features of the screening device. Bioaugmentation of retained or pass through fractions of the screen are also proposed. The illustrated apparatus and method may be applied to an activated sludge system as an example embodiment.

The present disclosure relates to an apparatus for selecting and retaining particles within an activated sludge system 100 (FIG. 1a) (or any other suitable system) for treating wastewater. According to one aspect of the present disclosure, the apparatus has a classifying screen 2 that applies a mesh-size in the range of from 10 microns to 10,000 microns, to select particles from an incoming stream 1. The incoming stream 1 may be mixed liquor from a tank 102, a solids recycle stream from a main solids-liquid separator 104, or an extracted waste-solids stream. In operation, the selected particles 4 (e.g., retained granules) are recycled by being returned to an upstream portion of the apparatus, for example, to the tank 102, the main solids-liquid separator 104, or the waste-solids stream. If desired, however, a portion of the selected particles 4 (i.e., a portion of the retained fraction) may be wasted to control the solids residence time of the selected particles. Thus, some of the fraction that is retained by the screening apparatus is returned to the upstream portion, partially or totally. If the fraction is only partially returned to the upstream portion, then the non-returned material may be wasted (26, FIGS. 3 and 4).

Figure 1E:
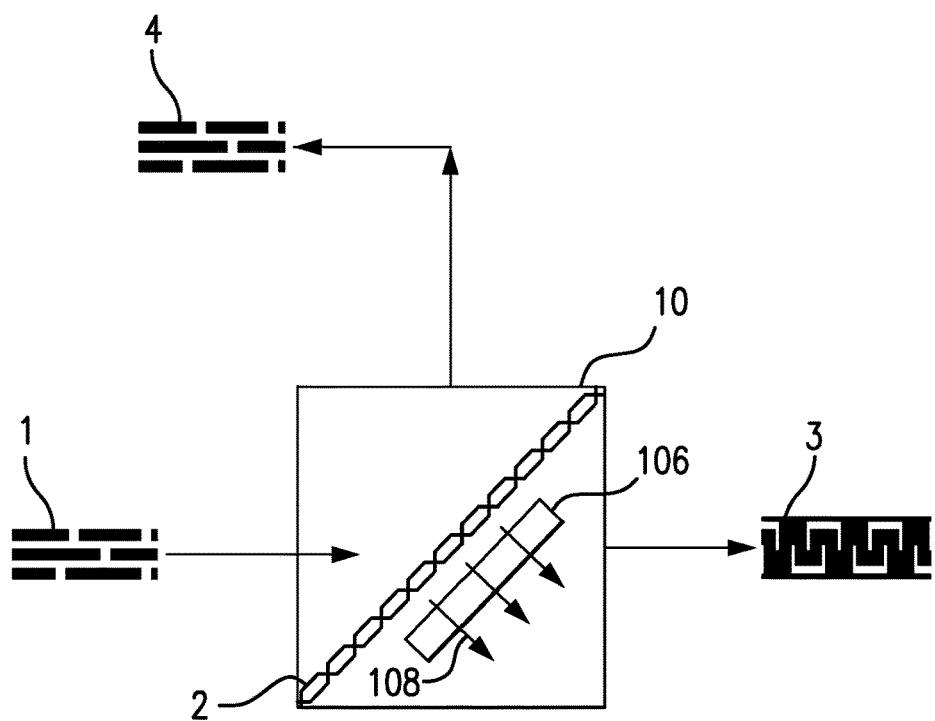

If desired, the apparatus may be equipped with a device 144 (FIG. 1b) which compresses particles located on the upstream side of the screen 2 during screening by applying positive pressure 5 to the particles. The device 144 may be, for example, a pressure head connected to a spray bar. Moreover, if desired, the apparatus may be equipped with a device 106 (FIG. 1e), located downstream from the screen 2, which compresses particles located on the upstream side of the screen 2 during screening by applying negative pressure 108 to the particles. The device 106 may be a suction head, and the vacuum 108 may be generated a suitable vacuum pump.

Figure 1F:
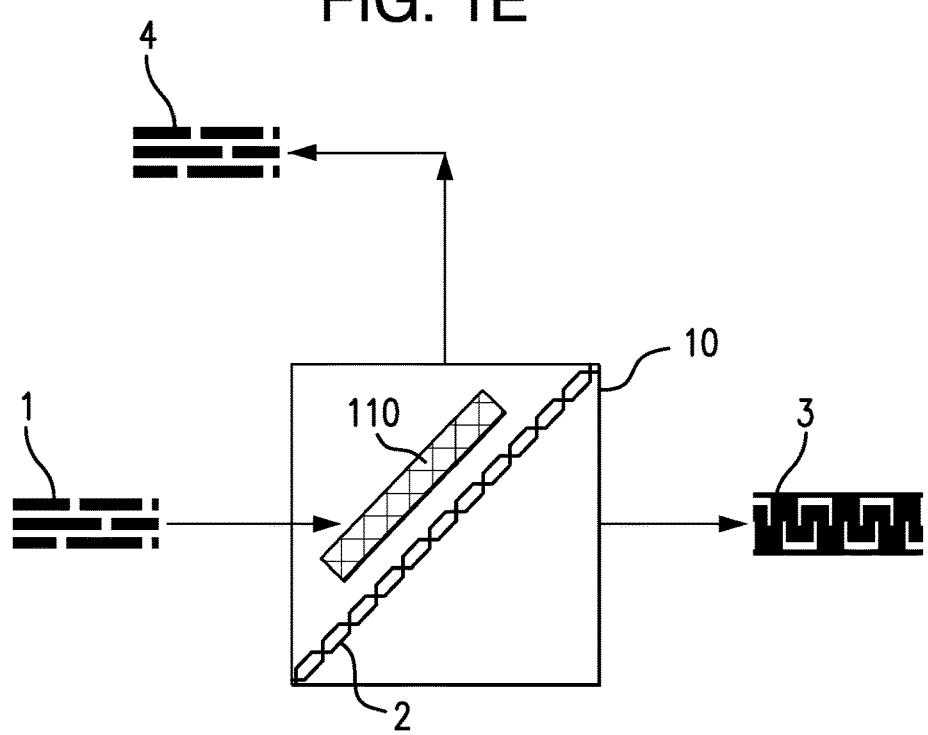

If desired, the apparatus may be equipped with a mechanism which applies a shear force on the particles during screening. The shear force may be generated by the oscillating movement of a vibrating screen, or rotating movement of a rotating drum screen, or by a separate mixing shear device upstream of the screen 2, or by more frequent recycling of the filtrate flow 1 to the screen 2. The screen 2 shown in FIGS. 1a, 1b, for example, may be a vibrating screen or a rotating drum screen. A separate mixing device 110 located upstream of a screen 2 is illustrated schematically in FIG. 1f.

According to another aspect of the present disclosure, preferential selection occurs based on resistance to shear of the material being screened. According to this aspect, the more shear-resistant fraction of the material is retained (4), and the exposed shear rate or time is controlled using an analytical or detection instrument 120, manually or automatically, to optimize selection of organisms or particles. In operation, the instrument 120, which may be a spectrophotometer, sends signals 122 to a controller 124, and the output of the controller 124 may be used by an operator to optimize the selection of organisms or particles. The selected organisms or particles may be the screened constituents 4. The non-selected organisms or particles may enter the waste stream 3. The analytical or detection instrument 120 may be employed with any of the screening devices described and shown in this application. The analytical or detection instrument 120 may be located upstream (i.e., on the retention side) or downstream (on the pass through side) from the respective screen(s).

According to another aspect of the present disclosure, the apparatus may be configured for preferential selection based on the compressibility of the material on the upstream side of the screen 2. According to this aspect, the less compressible fraction is retained (4), and the particle compression is controlled manually or automatically using an analytical or detection instrument 120, cooperating with a controller 124, to optimize the selection of organisms or particles. Likewise, the adjustment of the screen size can also be adjusted using an analytical instrument, where selected organisms or particles may be the screened constituents 4. The non-selected organisms or particles may enter the waste stream 3.

The present disclosure also relates to an apparatus for separating multiple solids fractions to maintain multiple solids residence times. The apparatus may be configured to preferentially select the fractions with a solids residence time higher than a desired threshold using classifying screens 2, and maintain the fractions with a lower solids residence time using any other solid-liquid separator. According to this aspect of the present disclosure, the sludge fractions that are retained and passed through may have relative proportions that are modulated from a minimum of 0% to a maximum of 100% by weight in order to adjust solids residence time of selected solids. The adjustment of solids residence times may involve a swapping of classifying screen sizes and/or solid-liquid separators for the higher and/or lower solids retention times respectively. The adjustment of solids residence time may involve adjusting the pore size of the screen(s) or adjusting the application of shear, compression, vacuum, vibration and/or other mechanical force to the screen(s). In addition, the solids residence times may be adjusted manually or automatically in response to detected readings of an analytical or detection instrument 120, cooperating with a controller 124, to optimize the selection of organisms or particles.

According to one embodiment, the screen 2 may select for part or all of granular solids which could if needed exhibit enhanced settling properties while the same screen 2 would allow for the passage of part or all of other non-granular solids. If desired, the preferential selection occurs based on particle size, such that the larger size is retained and the smaller size fraction passes through. According to another embodiment, the preferential selection occurs based on compressibility or resistance to shear, where the less compressible or more shear resistant fraction is retained (4).

According to another aspect of the present disclosure, additional shear-stress (or force) may be applied either by manipulation of the boundaries of the screens or by the liquid 5 in order to improve selection efficiency and to reduce diffusion resistance of the more shear resistant solids fraction.

Figure 1G:
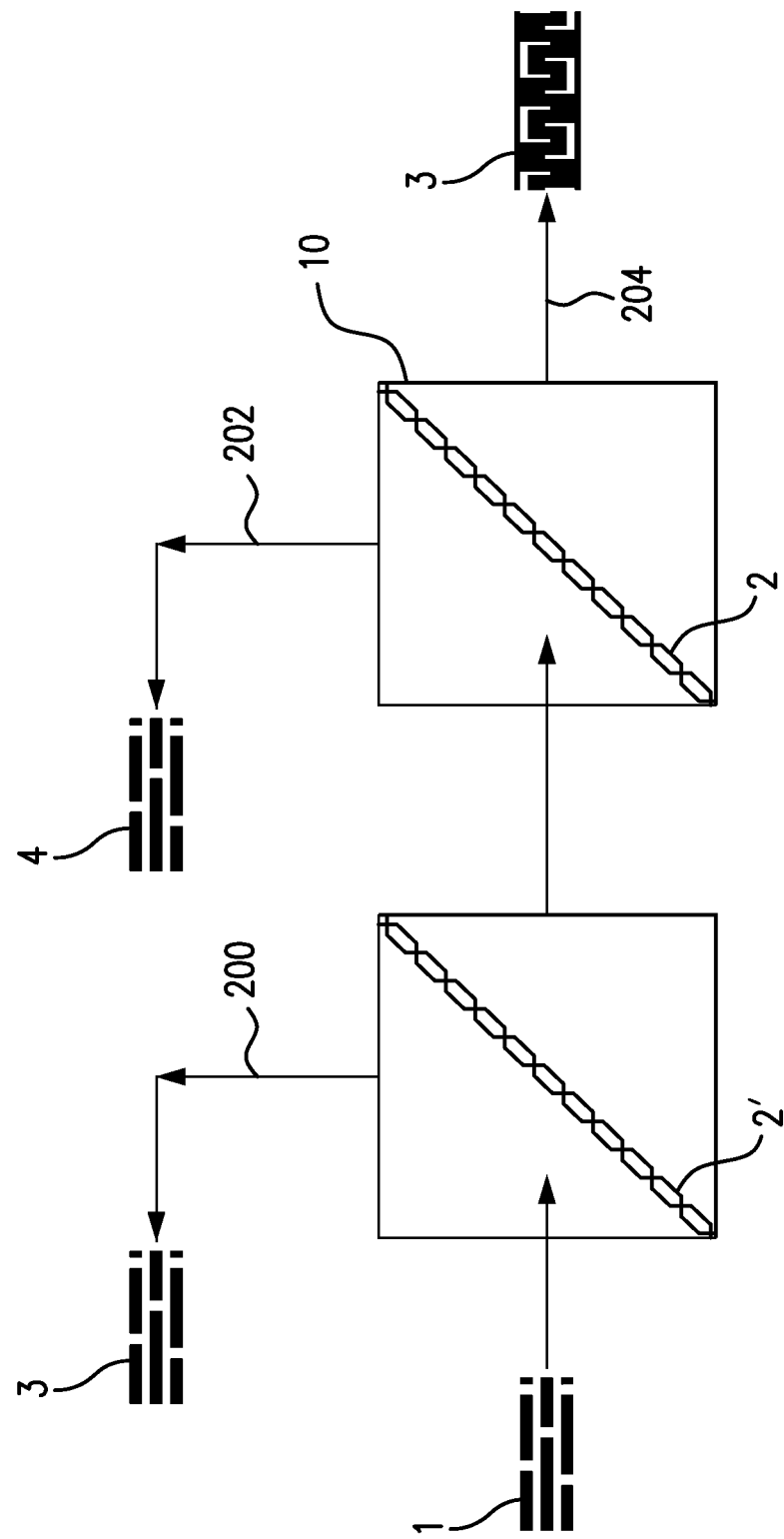

According to another aspect of the present disclosure, as illustrated schematically in FIG. 1g, a series of screens 2, 2' is used to select an upper and lower size range for selection. According to this aspect, particle sizes that are above the upper size range and below the lower size range are passed through (i.e., not selected). In the illustrated embodiment (FIG. 1g), the first screen 2' may have the upper size range and the second screen 2 may have the lower size range. The fraction 200 that is retained by the first screen 2' enters the waste stream 3. The fraction 202 that is retained by the second screen 2 enters the retained stream 4. The fraction 204 that is not retained by the second screen 2 enters the waste stream 3.

If desired, the relative proportions of the retained and passed-through sludge fractions 200, 202, 204 can be modulated from a minimum of 0% to a maximum of 100% by weight. Such modulation may be used to adjust solids residence time of selected solids.

The method described above may be applied to non-granular solids, including flocculant or dispersed solids, and the granular solids may be selected and retained under aerobic, anoxic or anaerobic or a combination of these conditions.

According to one aspect of the present disclosure, a classifying screen 2 can be applied at a waste sludge stream 1 which is taken either directly from a reactor (mixed liquor) or a recycle stream (RAS) at any point in a biological wastewater treatment process including in the mixed liquor, the return sludge or the waste sludge. In addition, the retained solids or pass through solids from screens 2 may be bioaugmented in other processes.

The screened solids 4 may be of biological origin. They, for example, consist of slower-growing organisms such as anaerobic ammonia oxidizing organisms or methanogenic organisms; aerobic organisms or anoxic organisms; and/or organisms that can coexist symbiotically to develop niche fractions based on exposure to air or other substrates. According to one aspect of the present disclosure, slower-growing organisms are preferentially retained by one or more screens, and returned, partially or totally, to an upstream portion of an activated sludge process, to controllably increase the solids residence time of the slower-growing organisms relative to that of faster-growing organisms.

According to another aspect of the disclosure, the screened solids 4 may have chemically reactive properties. The screened solids 4 may be in the form of a resin, sorbent or catalyst, and they may be used to remove pollutants.

According to another aspect of the present disclosure, an adjustment of solids residence times requires a swapping of classifying screen sizes and/or solid-liquid separators for the higher and/or lower solids residence times respectively.

The invention is not limited to the structures, methods and instrumentalities described above and shown in the drawings. The invention is defined by the claims set forth below.

What is claimed and desired to be protected by Letters Patent of the United States is:

1. A wastewater treatment system, comprising:
a bioreactor tank; and
apparatus for selecting and retaining particles, the apparatus being located downstream of the bioreactor tank, and wherein the apparatus includes a classifying screen having a mesh-size in the 10-5,000 micron range to select particles from mixed liquor of the bioreactor tank, a solids recycle stream from a main solids-liquid separator, or from an extracted waste-solids-stream, wherein preferential selection occurs within the apparatus based on compressibility or resistance to shear, where a less compressible or more shear resistant fraction does not pass through the classifying screen and is thereby retained by the apparatus, while a more compressible or less shear resistant fraction passes through the screen and is not retained by the apparatus, and wherein the wastewater treatment system is configured to return at least some of the fraction which does not pass through the classifying screen to a portion of the wastewater treatment system that is upstream of the apparatus for selecting and retaining particles, wherein the retained particles include organic or reactive material, wherein the wastewater treatment system is configured such that at least some material which does pass through the classifying screen does not flow from the classifying screen into the bioreactor tank, and wherein the wastewater treatment system is configured to waste at least some of the more compressible or less shear resistant fraction which does pass through the classifying screen.

2. The system of claim 1, further comprising a device which compresses particles during screening by applying positive or negative pressure to the particles.

3. The system of claim 1, further comprising a mechanism which applies a shear stress (or force) on the particles by oscillating movements of the screen in the case of using a vibrating screen, or rotating movements in the case of using a rotating drum screen, or by using a separate mixing shear device upstream of the screen, or by more frequent recycling of the filtrate flow to the screen.

4. The system of claim 1 wherein the exposed shear rate or time is controlled using an analytical or detection instrument manually or automatically to optimize selection of organisms or particles retained by the screen.

5. The system of claim 1 wherein particle compression is controlled manually or automatically using an analytical or detection instrument to optimize selection of organisms or particles retained by the screen.

6. The system of claim 1, wherein the retained particles are granular solids that are retained under aerobic, anoxic or anaerobic or a combination of these conditions, and wherein non-granular solids include flocculant or dispersed solids.

7. The system of claim 1, wherein material in the wastewater treatment system is bioaugmented.

8. The system of claim 1, wherein the organic or reactive material includes slower growing organisms such as anaerobic ammonia oxidizing organisms or methanogenic organisms, aerobic organisms or anoxic organisms, organisms that can coexist symbiotically to develop niche fractions based on exposure to air or other substrates.

9. The system of claim 1, wherein the retained particles are in the form of a resin, sorbent or catalyst to remove pollutants.

10. A wastewater treatment system, comprising:
a bioreactor; and
apparatus for separating multiple solids fractions to maintain multiple solids residence times in the wastewater treatment system, the apparatus including:
a first classifying screen for preferentially selecting fractions with a solids residence time higher than a desired threshold, wherein the preferential selection occurs based on compressibility or resistance to shear, where a less compressible or more shear-resistant fraction does not pass through the first classifying screen and is thereby retained by the first classifying screen, while a more compressible or less shear resistant fraction passes through the screen and is not retained by the apparatus; and
an analytical or detection instrument that is located either upstream or downstream of the first classifying screen for optimizing selection of organisms or particles retained by the screen, wherein the solids residence times are adjusted manually or automatically in response to the detected readings of the analytical or detection instrument, wherein the apparatus is configured to return at least some of the fraction which does not pass through the first classifying screen to a portion that is upstream of the first classifying screen, wherein the retained organisms or particles include organic or reactive material, wherein the wastewater treatment system is configured such that at least some material which does pass through the classifying screen does not flow from the classifying screen into the bioreactor tank, and wherein the wastewater treatment system is configured to waste at least some of the more compressible or less shear resistant fraction which does pass through the screen.

11. The wastewater treatment system of claim 10, further comprising a solid-liquid separator for maintaining fractions with a lower solids residence time, such that retained and passed through sludge fractions have relative proportions that can be modulated from a minimum of 0% to a maximum of 100% by weight in order to adjust solids residence time of selected solids.

12. The system of claim 11 further comprising a second classifying screen.

13. The system of claim 10, wherein the classifying screen can be applied to a waste sludge stream which is taken either directly from a reactor (mixed liquor) or a recycle stream (RAS) at any point in a biological wastewater treatment process including in the mixed liquor, a return sludge, or a waste sludge.

14. An activated sludge system for treating wastewater, said system comprising the wastewater treatment system of claim 1.

* * * * *